United States Patent [19]

Homola et al.

[11] Patent Number: 4,542,071

[45] Date of Patent: Sep. 17, 1985

[54] LUBRICATED MAGNETIC RECORDING DISK

[75] Inventors: Andrew M. Homola, Morgan Hill; Heinrich Sussner, Monte Sereno, both of Calif.

[73] Assignee: International Business Machines Corporation, Armonk, N.Y.

[21] Appl. No.: 513,897

[22] Filed: Jul. 14, 1983

[51] Int. Cl.⁴ ............................................. B32B 9/00
[52] U.S. Cl. .................................. 428/428; 428/692; 428/694; 428/695
[58] Field of Search ............... 428/692, 694, 695, 428, 428/323

[56] References Cited

U.S. PATENT DOCUMENTS

| 2,885,366 | 5/1959 | Iler | 252/313 |
| 4,007,314 | 2/1977 | Higuchi et al. | 428/695 |
| 4,280,918 | 7/1981 | Homola et al. | 252/62.51 |
| 4,320,159 | 3/1982 | Ogawa et al. | 428/594 |
| 4,336,310 | 6/1982 | Okuyama et al. | 428/695 |

FOREIGN PATENT DOCUMENTS 167131 10/1982 Japan ................................. 428/695

*Primary Examiner*—John E. Kittle
*Assistant Examiner*—James J. Seidleck
*Attorney, Agent, or Firm*—Joseph G. Walsh

[57] ABSTRACT

A magnetic disk is lubricated by being overcoated first with a permanently bound monolayer of silica spheres about 7 nm in diameter and on top of said monolayer a skin-like film of amorphous silica about 2 to 13 nm thick.

2 Claims, No Drawings

LUBRICATED MAGNETIC RECORDING DISK

DESCRIPTION

1. Technical Field

The present invention deals with a lubricated magnetic recording disk.

2. Background Art

U.S. Pat. No. 4,280,918 shows a process for coating individual magnetic particles with silica particles.

U.S. Pat. No. 2,885,366 shows a process for forming a skin of silica.

DISCLOSURE OF THE INVENTION

According to the present invention, a magnetic recording disk is provided with a permanently bound lubricant overcoat. The overcoat has two layers. The bottom layer, i.e. that closest to the substrate, is a monolayer of silica spheres about 7 nm is diameter. This monolayer is in turn overcoated with at least one more layer, namely a skin-like film of amorphous silica about 2 to 13 nm thick.

The present invention provides a lubricant which is immobile (i.e. no spin-off), strong enough to protect the magnetic coating (no crashes) and thin enough to allow high density recording (no major spacing loss).

The present invention may be applied to any magnetic disk recording system. Such systems typically comprise a substrate such as silicon, glass, metal or plastic, and a magnetic medium which is usually a cobalt-chromium alloy or gamma $Fe_2O_3$. Usually the magnetic medium is on top of the substrate, and sometimes it is dispersed throughout a plastic binder.

In making the disks of the present invention, monodisperse spheres of colloidal silica are permanently bound to the disk surface by utilizing the electrostatic attraction of oppositely charged surfaces in an aqueous system. Subsequent dehydration leaves a permanently bound monolayer of silica spheres about 7 nm in diameter. This part of the process is similar to that in U.S. Pat. No. 4,280,918 mentioned above.

In the next step of the process, the monolayer is strengthened by sealing it with at least one thin layer of amorphous silica. This part of the process is similar to that of U.S. Pat. No. 2,885,366 mentioned above.

PREFERRED EMBODIMENT

A clean disk surface is brought in contact with a 5% solution of colloid silica such as Ludox SM, 7 nm from duPont at pH 3.5. (The pH was adjusted with cationic ion exchange resin.) The disk is kept in the stirred dispersion for about five minutes. It is then removed from the dispersion and excess silica is washed off with water. The disk is then placed in an oven at 150° C. for 30 minutes. The disk is then dipped in a 1% solution of sodium silicate and then heated at 95° C. for ten minutes. This step generates a skin about 2.5 nm thick of amorphous silica, which serves to fortify and seal the monolayer. It also acts to inhibit corrosion. To enhance the wear resistance of the disk, the thickness of the skin can be increased by repeating the last step.

The presence of the overcoat of the present invention allows flying at $5\mu$ in a dry state on cobalt-chromium alloy and gamma $Fe_2O_3$ media. The disk has been used successfully in up to 18,000 start-stop cycles. No appreciable friction been encountered, and no significant head debris has been observed.

We claim:

1. A magnetic recording disk characterized by a lubricant overcoat of a permanently bound monolayer of silica spheres about 7 nm in diameter, and on top of said monolayer a skin-like film of amorphous silica about 2 to 13 nm thick.

2. A disk as claimed in claim 1 wherein there are a plurality of skin-like films of amorphous silica.

* * * * *

UNITED STATES PATENT AND TRADEMARK OFFICE
CERTIFICATE OF CORRECTION

PATENT NO. : 4,542,071
DATED : September 17, 1985
INVENTOR(S) : Andrew M. Homola and Heinrich Sussner It is certified that error appears in the above-identified patent and that said Letters Patent is hereby corrected as shown below:

Col. 2, line 28, "friction" should read -- stiction has --.

*Signed and Sealed this*

*Twenty-first* Day of *January 1986*

[SEAL]

*Attest:*

DONALD J. QUIGG

*Attesting Officer*   *Commissioner of Patents and Trademarks*